US011150322B2

(12) United States Patent
Jadav et al.

(10) Patent No.: US 11,150,322 B2
(45) Date of Patent: Oct. 19, 2021

(54) DYNAMIC, COGNITIVE HYBRID METHOD AND SYSTEM FOR INDOOR SENSING AND POSITIONING

(71) Applicant: International Business Machines Corporation, Armonk, NY (US)

(72) Inventors: Divyesh Jadav, San Jose, CA (US); Thomas D. Griffin, Campbell, CA (US); German H Flores, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 219 days.

(21) Appl. No.: 16/137,349

(22) Filed: Sep. 20, 2018

(65) Prior Publication Data

US 2020/0096598 A1 Mar. 26, 2020

(51) Int. Cl.
*H04W 4/33* (2018.01)
*G01S 5/02* (2010.01)
(Continued)

(52) U.S. Cl.
CPC .......... *G01S 5/0257* (2013.01); *G01S 5/0284* (2013.01); *G01S 5/14* (2013.01); *G01S 11/06* (2013.01);
(Continued)

(58) Field of Classification Search
CPC ........ G01S 5/0257; G01S 5/14; G01S 5/0284; G01S 11/06; G01S 5/0252; G06N 20/00;
(Continued)

(56) References Cited

U.S. PATENT DOCUMENTS 8,174,931 B2 * 5/2012 Vartanian ................ G01S 19/13
367/99
2014/0335893 A1 11/2014 Ronen
(Continued)

FOREIGN PATENT DOCUMENTS

CN 106792524 A 5/2017
WO 2014158007 A1 10/2014

OTHER PUBLICATIONS

Liu et al., "Survey of Wireless Indoor Positioning Techniques and Systems," IEEE Transactions on Systems, Man, and Cybernetics, Part C, vol. 37, No. 6, Nov. 2007, pp. 1067-1080.
(Continued)

*Primary Examiner* — Marcus Hammonds
(74) *Attorney, Agent, or Firm* — Zilka-Kotab, P.C.

(57) ABSTRACT

According to one embodiment, a computer-implemented method for dynamic, cognitive hybrid positioning within an indoor environment includes: receiving fingerprinting training data corresponding to the indoor environment, trilateration data corresponding to the indoor environment, triangulation data corresponding to the indoor environment, or a combination of the fingerprinting training data, the trilateration data, and/or the triangulation data; estimating a layout of the indoor environment based at least in part on the fingerprinting training data; classifying at least some areas of the estimated layout according to one of a plurality of predetermined area types; and determining an optimum positioning technique to utilize for each area of the estimated layout, wherein the optimum positioning technique is determined based at least in part on the area type. Corresponding system and computer program product embodiments are also disclosed, as well as hybrid techniques for determining user position within an environment.

22 Claims, 7 Drawing Sheets

(51) Int. Cl.
  *H04W 4/021* (2018.01)
  *H04W 4/029* (2018.01)
  *H04W 4/02* (2018.01)
  *G01S 11/06* (2006.01)
  *G01S 5/14* (2006.01)
  *G06N 20/00* (2019.01)

(52) U.S. Cl.
  CPC ............ *G06N 20/00* (2019.01); *H04W 4/021* (2013.01); *H04W 4/023* (2013.01); *H04W 4/025* (2013.01); *H04W 4/029* (2018.02); *H04W 4/33* (2018.02)

(58) Field of Classification Search
  CPC ..... H04W 4/023; H04W 4/029; H04W 4/021; H04W 4/025; H04W 4/33; H04W 4/024; H04W 4/80
  See application file for complete search history.

(56) References Cited

U.S. PATENT DOCUMENTS

2017/0108575 A1   4/2017   Yang et al.
2017/0371023 A1*  12/2017  Syrjarinne ............ H04W 4/025

OTHER PUBLICATIONS

Chen et al., "An iBeacon Assisted Indoor Localization and Tracking System," IPSN'15, 2015, 1 page.
Adalja et al., "Fingerprinting Based Indoor Positioning System using RSSI Bluetooth," International Journal for Scientific Research & Development, vol. 1, No. 4, 2013, pp. 889-894.
Wei et al., "Indoor localization method comparison: Fingerprinting and Trilateration algorithm," University of Saskatchewan, 2011, 3 pages, retrieved from http://rose.geog.mcgill.ca/ski/system/files/fm/20111Wei.pdf.
Shchekotov, M., "Indoor Localization Method Based on Wi-Fi Trilateration Technique," Proceeding of the 16th Conference of Fruct Association, 2014, pp. 177-179.
Chan et al., "Indoor Localization Using Wi-Fi Based Fingerprinting and Trilateration Techniques for LBS Applications," International Archives of the Photogrammetry, Remote Sensing and Spatial Information Sciences, vol. XXXVII-4/C26, 2012, pp. 1-5.
Subhan et al., "Indoor Positioning in Bluetooth Networks using Fingerprinting and Lateration approach," IEEE International Conference on Information Science and Applications, 2011, 9 pages.
Budina et al., "Method of iBeacon Optimal Distribution for Indoor Localization," Springer International Publishing, 2015, pp. 105-117.
Jadav et al., U.S. Appl. No. 17/305,900, filed Jul. 16, 2021.

* cited by examiner

| Algorithm 1: Location Sensor Indoor Mapping |
|---|
| 1 Given:<br>　　{Boffline}, set of annotated location sensor readings from training data<br>　　{Bstatic}, set of deployed location sensors (includes location sensor IDs and (X, Y) location of deployment)<br><br>2 Initialize:<br>　　M = ∞, geometric map based on location sensor readings<br>　　δ = K, the RSSI threshold defined as weak signal, where K is a minimum signal threshold, which may be learned from the training data or designated by the user<br>　　$\rho_{min}$ = minimum density threshold<br>　　$\chi_{min}$ = minimum crossing threshold<br><br>3 for each {Boffline}:<br>4　　draw a line between each Boffline && Bstatic:<br>5　　　　draw a first line type if the received signal strength indicator (RSSI) is >= δ<br>6　　　　draw a second line type if the received signal strength is < δ<br><br>7 Find regions that best encapsulate the areas defined by first and second line types. For example, using convex hull algorithm, Graham scan, Quickhull, or other known clustering algorithm(s).<br><br>8 Classify areas within the space as either walls, hallways, or open spaces based on the density of the regions<br>　　*hallways*: dense first line type areas, e.g. having a density above a minimum density threshold $\rho_{min}$, and sparse second line type crossings, i.e. having a number of crossings below a minimum crossing threshold $\chi_{min}$<br>　　*walls*: dense second line type crossings, i.e. having a number of crossings above a minimum crossing threshold $\chi_{min}$, and sparse first line type areas, e.g. having a density below a minimum density threshold $\rho_{min}$<br>　　*open spaces*: empty areas and/or dense first line type regions, e.g. having a density above a minimum density threshold $\rho_{min}$, and having a number of crossings below a minimum crossing threshold $\chi_{min}$<br><br>9 auto sketch and label walls, hallways, and open spaces using known techniques<br><br>10 (optional) Allow user correction of geometric shapes, e.g. by manually dragging various points/vertices of the initial shape to redefine/correct into a final shape<br><br>11 label map as either 'open space', 'closed space', or 'undetermined' based on the sparsity of the estimated areas<br><br>12 return M |

FIG. 4A

Algorithm 2: Hybrid Positioning

Given:
  $\{B^{offline}\}$, set of annotated location sensor readings from fingerprinting approach
  $\{B^{online}\}$, set of location sensor readings at time t
  $\{M_i\}$, set of geometric maps estimated from location sensor readings

Init:
  $X' = Y' = \infty$
  mapID = floorID = $\infty$
  latitude = longitude = $\infty$

Algorithm:
```
For each {B^online} then
   If {M_i}.locationSensor.IDs == {B^online}.IDs then
   |   If {B^online}.length > 0 && {B^online}.length < 3 then
   |   |   Do fingerprinting, returns (X',Y')
   |   Else If {B^online}.length >= 3 then
   |   |      If {M_i}.type == "open space" then
   |   |      |   Do trilateration/triangulation, returns (X',Y')
   |   |      Else If {M_i}.type == "closed space" then
   |   |      |   Do fingerprinting, returns (X',Y')
   |   |      Else If {M_i}.type == "undetermined" then
   |   |      |   Do fingerprinting, returns (X',Y')
   |   |      |   Do trilateration/triangulation, returns (X',Y')
   |   |      |   Find optimal (X'-Y') location, calculated from a similarity scoring
   |   |      |   measure or error metric such that optimal location (X_opt, Y_opt) = min
   |   |      |   distance between fingerprinting and trilateration/triangulation solutions
   |   |      Else
   |   |      |   Do fingerprinting, returns (X',Y')
   |   |      End If
   |   Else
   |   |   Do not solve. No location sensors around
   |   End If
   Else
   |   Do not solve. The online location sensor readings do not match this map's readings
   End If
End For Determine (mapID, latitude, longitude, floorID) from (X',Y') and identifying information collected about the location sensors Return (X',Y',mapID, latitude, longitude, floorID)
```

FIG. 4B

DYNAMIC, COGNITIVE HYBRID METHOD AND SYSTEM FOR INDOOR SENSING AND POSITIONING

BACKGROUND

The present invention relates to indoor location services, and more specifically, this invention relates to cognitive, hybrid techniques and systems for indoor sensing and positioning based on building type.

The use of Global Positioning System (GPS) to detect the location and direction of a client device (or GPS receiver), and thence to navigate from point A to point B is well established. The GPS receiver uses signals from at least 4 GPS orbiting satellites to calculate a three dimensional Cartesian coordinate (with the Earth's center as origin) of the receiver device. The coordinates are often converted to the more well-known latitude and longitude and elevation above sea level system. GPS technology works very well for positioning, when there are no obstructions to the receipt of satellite signals.

However, the inside of a building is not so friendly. There are materials that absorb or dampen the satellite signals, which often renders GPS unusable inside a building. In contemporary society, users spend a big portion of their time inside a building—at work and/or for leisure. In a large building such as a mall, a warehouse, a university or corporate campus, a visitor often needs assistance to determine where he is in the building, and how to get from point A to point B.

Wi-Fi networks have been explored as one potential solution for indoor navigation, however, most enterprises would prefer not to expose and use their Wi-Fi networks for orthogonal uses like for example Wi-Fi real-time location system (RTLS) positioning and routing due to performance and security exposure reasons; nor would prefer to expand their existing Wi-Fi network infrastructure, e.g. adding additional Wi-Fi access points, to increase coverage and reliability due to additional installation and maintenance costs.

Accordingly, it would be beneficial to provide novel and useful systems, methods, and computer program products for facilitating indoor position sensing.

SUMMARY

According to one embodiment, a computer-implemented method for dynamic, cognitive hybrid positioning within an indoor environment includes: receiving fingerprinting training data corresponding to the indoor environment, trilateration data corresponding to the indoor environment, triangulation data corresponding to the indoor environment, or a combination of the fingerprinting training data, the trilateration data, and/or the triangulation data; estimating a layout of the indoor environment based at least in part on the fingerprinting training data; classifying at least some areas of the estimated layout according to one of a plurality of predetermined area types; and determining an optimum positioning technique to utilize for each area of the estimated layout, wherein the optimum positioning technique is determined based at least in part on the area type.

According to another embodiment, a computer program product for dynamic, cognitive hybrid positioning within an indoor environment includes a computer readable medium having program instructions embodied therewith, where the computer readable medium is not a transitory signal per se. The program instructions are executable by a processor to cause the processor to perform a method, comprising: receiving, at the processor, fingerprinting training data corresponding to the indoor environment, trilateration data corresponding to the indoor environment, triangulation data corresponding to the indoor environment, or a combination of the fingerprinting training data, the trilateration data, and/or the triangulation data; estimating, using the processor, a layout of the indoor environment based at least in part on the fingerprinting training data; classifying, using the processor, at least some areas of the estimated layout according to one of a plurality of predetermined area types; and determining, using the processor, an optimum positioning technique to utilize within each area of the estimated layout, wherein the optimum positioning technique is determined based at least in part on the area type.

According to yet another embodiment, a system for dynamic, cognitive hybrid positioning within an indoor environment includes: a processor; and logic integrated with the processor, executable by the processor, or integrated with and executable by the processor. The logic is configured to: receive fingerprinting training data corresponding to the indoor environment, trilateration data corresponding to the indoor environment, triangulation data corresponding to the indoor environment, or a combination of the fingerprinting training data, the trilateration data, and/or the triangulation data; estimate a layout of the indoor environment based at least in part on the fingerprinting training data; classify at least some areas of the estimated layout according to one of a plurality of predetermined area types; and determine an optimum positioning technique to utilize within each area of the estimated layout, wherein the optimum positioning technique is determined based at least in part on the area type.

According to still yet another embodiment, a computer-implemented method for estimating location of a user within an indoor environment includes: receiving: identifying information of one or more location sensors deployed within the indoor environment; and signal strength of one or more signals received from the one or more location sensors at one or more location(s) relative to the one or more location sensors; and processing the identifying information and the signal strength(s) using an algorithm configured to classify areas of the indoor environment by type and estimate a layout of the indoor environment; processing the identifying information and the signal strength(s) using either: a fingerprinting technique, a trilateration technique, a triangulation technique; or a combination of the fingerprinting technique, the trilateration technique, and/or the triangulation technique; determining one or more optimal positioning techniques to utilize for providing navigation services within each area of the estimated layout, wherein the optimum positioning technique(s) is/are determined based at least in part on the classified area type; and estimating a location of a user sensing device using the one or more optimal positioning techniques.

According to still yet another embodiment, a computer program product for dynamic, cognitive hybrid positioning within an indoor environment includes a computer readable medium having program instructions embodied therewith, where the computer readable medium is not a transitory signal per se. The program instructions are executable by a processor to cause the processor to perform a method, including: receiving, at the processor: identifying information of one or more location sensors deployed within the indoor environment; and signal strength of one or more signals received from the one or more location sensors at one or more location(s) relative to the one or more location sensors; and processing, using the processor, the identifying information and the signal strength(s) using an algorithm configured to classify areas of the indoor environment by type and estimate a layout of the indoor environment; processing the identifying information and the signal strength(s) using either: a fingerprinting technique, a trilateration technique, a triangulation technique; or a combination of the fingerprinting technique, the trilateration technique, and/or the triangulation technique; determining, using the processor, one or more optimal positioning techniques to utilize for providing navigation services within each area of the estimated layout, wherein the optimum positioning technique(s) is/are determined based at least in part on the classified area type; and estimating, using the processor, a location of a user sensing device using the one or more optimal positioning techniques.

Other aspects and embodiments of the present invention will become apparent from the following detailed description, which, when taken in conjunction with the drawings, illustrate by way of example the principles of the invention.

BRIEF DESCRIPTION OF THE DRAWINGS

FIG. 4A is a pseudocode representation of an algorithm for estimating a layout of an indoor location, according to one embodiment.

FIG. 4B is a pseudocode representation of an algorithm for a hybrid positioning technique, according to one embodiment.

DETAILED DESCRIPTION

Figure 1:
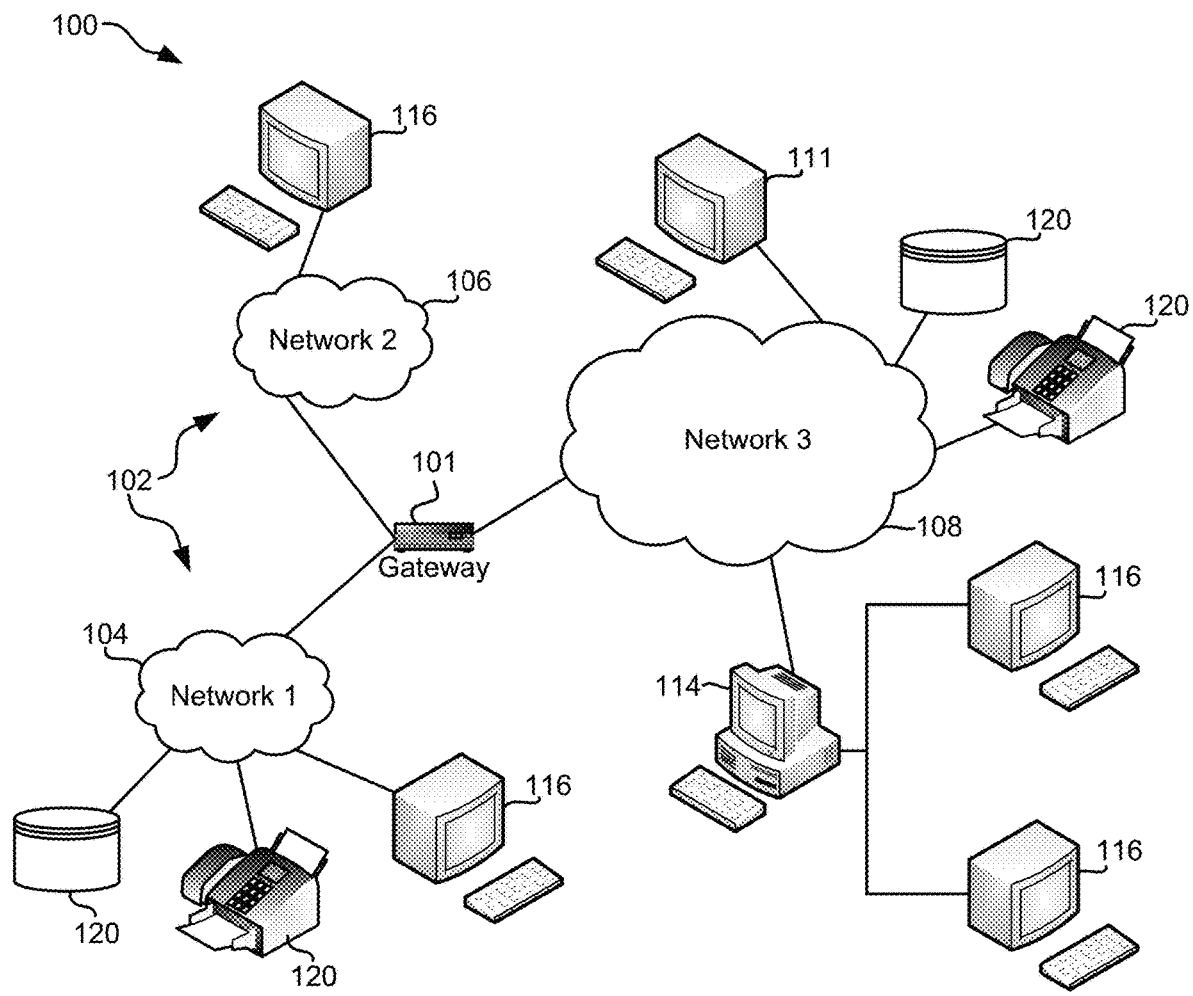
FIG. 1 illustrates a network architecture, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "cognitive" refers to techniques capable of receiving user feedback regarding prior performance of the technique, processing the information to formulate a better understanding of the technique, and adjusting the technique to improve performance with accumulating experience.

Also as used herein, the term "dynamic" means the adaptation and/or the transition from one technique to another, or the use of both techniques, to improve performance.

As referred to in the present document, "hybrid" approaches are those capable of using multiple distinct techniques to solve (or attempt to solve) a problem. Multiple techniques need not be utilized for each event, but the hybrid system/technique is capable of doing so. For instance, in one embodiment the presently described inventive concepts may switch back and forth between fingerprinting-based and trilateration/triangulation-based position sensing to provide the most accurate location information available during a given navigational assistance instance.

As referenced herein, the term "location sensor" shall be understood as any type of device capable of broadcasting a signal, or signals, from which the location and preferably the identity of the sensor may be determined. Broadcasting may include actively transmitting signal(s), reflecting received signal(s), or any equivalent thereof that would be appreciated by a person having ordinary skill in the art upon reading the present disclosure. In various embodiments, exemplary types of location sensors include, but are not limited to, Wi-Fi access points, GPS devices, RFID devices, beacons such as Bluetooth Low Energy (BLE) beacons, of any variety and in any combination, without limitation, as well as equivalents thereof that a skilled artisan would appreciate upon reading this description.

As understood herein, "sensing devices" refer to any type of device, preferably a mobile device such as a handheld computer, personal digital assistant, tablet, smartphone, and any equivalents thereof that would be understood by skilled artisans reading this description as capable of receiving signals from location sensors deployed throughout an environment, and processing such signals (e.g. using dedicated application software, a dedicated API, and/or services running on or otherwise provided to/by the sensing device) to determine a location of the location sensor sending the signal. Preferably, the sensing device also includes a graphical display and/or auditory components such as a microphone and speakers to provide visual and/or auditory information to the user, as well as receive input from the user, e.g. via a touchscreen or the microphone. The sensing device also preferably serves as a primary interface between the system and the user/client, and facilitates cognitive aspects of the invention, as described in greater detail below.

The following description discloses several preferred embodiments of systems, methods and computer program products for dynamic, cognitive, hybrid indoor sensing and positioning. More specifically, the presently described inventive concepts include sensing a type of location, e.g. a building type, floor plan, layout, etc., where a user is located, and cognitively chooses a best positioning algorithm among a plurality of positioning algorithms. Based on user feedback received in response to navigating through the location in question using the cognitively chosen positioning algorithm, the algorithm, or parts thereof, may be refined over time to improve performance thereof in the particular environment.

According to one general embodiment, a computer-implemented method for dynamic, cognitive hybrid positioning within an indoor environment includes: receiving fingerprinting training data corresponding to the indoor environment, trilateration data corresponding to the indoor environment, triangulation data corresponding to the indoor environment, or a combination of the fingerprinting training data, the trilateration data, and/or the triangulation data; estimating a layout of the indoor environment based at least in part on the fingerprinting training data; classifying at least some areas of the estimated layout according to one of a plurality of predetermined area types; and determining an optimum positioning technique to utilize for each area of the estimated layout, wherein the optimum positioning technique is determined based at least in part on the area type.

According to another general embodiment, a computer program product for dynamic, cognitive hybrid positioning within an indoor environment includes a computer readable medium having program instructions embodied therewith, where the computer readable medium is not a transitory signal per se. The program instructions are executable by a processor to cause the processor to perform a method, comprising: receiving, at the processor, fingerprinting training data corresponding to the indoor environment, trilateration data corresponding to the indoor environment, triangulation data corresponding to the indoor environment, or a combination of the fingerprinting training data, the trilateration data, and/or the triangulation data; estimating, using the processor, a layout of the indoor environment based at least in part on the fingerprinting training data; classifying, using the processor, at least some areas of the estimated layout according to one of a plurality of predetermined area types; and determining, using the processor, an optimum positioning technique to utilize within each area of the estimated layout, wherein the optimum positioning technique is determined based at least in part on the area type.

According to yet another general embodiment, a system for dynamic, cognitive hybrid positioning within an indoor environment includes: a processor; and logic integrated with the processor, executable by the processor, or integrated with and executable by the processor. The logic is configured to: receive fingerprinting training data corresponding to the indoor environment, trilateration data corresponding to the indoor environment, triangulation data corresponding to the indoor environment, or a combination of the fingerprinting training data, the trilateration data, and/or the triangulation data; estimate a layout of the indoor environment based at least in part on the fingerprinting training data; classify at least some areas of the estimated layout according to one of a plurality of predetermined area types; and determine an optimum positioning technique to utilize within each area of the estimated layout, wherein the optimum positioning technique is determined based at least in part on the area type.

According to still yet another general embodiment, a computer-implemented method for estimating location of a user within an indoor environment includes: receiving: identifying information of one or more location sensors deployed within the indoor environment; and signal strength of one or more signals received from the one or more location sensors at one or more location(s) relative to the one or more location sensors; and processing the identifying information and the signal strength(s) using an algorithm configured to classify areas of the indoor environment by type and estimate a layout of the indoor environment; processing the identifying information and the signal strength(s) using either: a fingerprinting technique, a trilateration technique, a triangulation technique; or a combination of the fingerprinting technique, the trilateration technique, and/or the triangulation technique; determining one or more optimal positioning techniques to utilize for providing navigation services within each area of the estimated layout, wherein the optimum positioning technique(s) is/are determined based at least in part on the classified area type; and estimating a location of a user sensing device using the one or more optimal positioning techniques.

According to a further general embodiment, a computer program product for dynamic, cognitive hybrid positioning within an indoor environment includes a computer readable medium having program instructions embodied therewith, where the computer readable medium is not a transitory signal per se. The program instructions are executable by a processor to cause the processor to perform a method, including: receiving, at the processor: identifying information of one or more location sensors deployed within the indoor environment; and signal strength of one or more signals received from the one or more location sensors at one or more location(s) relative to the one or more location sensors; and processing, using the processor, the identifying information and the signal strength(s) using an algorithm configured to classify areas of the indoor environment by type and estimate a layout of the indoor environment; processing the identifying information and the signal strength(s) using either: a fingerprinting technique, a trilateration technique, a triangulation technique; or a combination of the fingerprinting technique, the trilateration technique, and/or the triangulation technique; determining, using the processor, one or more optimal positioning techniques to utilize for providing navigation services within each area of the estimated layout, wherein the optimum positioning technique(s) is/are determined based at least in part on the classified area type; and estimating, using the processor, a location of a user sensing device using the one or more optimal positioning techniques.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a local area network (LAN), a wide area network (WAN) such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, wearable device, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
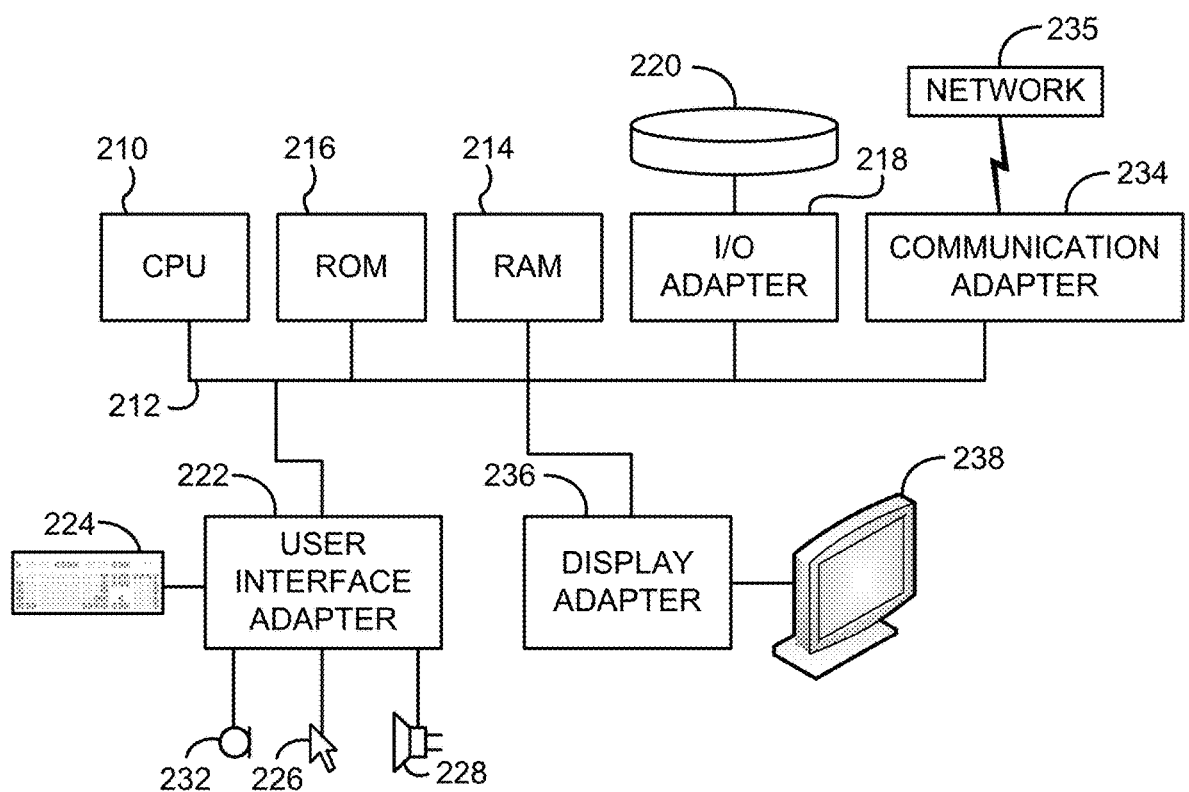
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an input/output (I/O) adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using eXtensible Markup Language (XML), C, and/or C++ language, or other programming languages, along with an object oriented programming methodology. Object oriented programming (OOP), which has become increasingly used to develop complex applications, may be used.

Returning now more specifically to the notion of positioning within an indoor environment, conventional personal navigation systems or location-based services provide users with directional or contextual information as they travel unfamiliar environments (e.g., airports, shopping malls, corporations). The aim of these systems is to provide users with mobile advertising, navigational information, and localization. Several technologies have been explored that use active or passive RFID tags, wireless local area networks (WLAN), Bluetooth, GSM cellular networks, and other technologies for indoor positioning. Unique identifying information from these technologies can be used to achieve indoor localization. For example, the Received Signal Strength (RSS) from WLAN or Bluetooth location sensors could be used to calculate the distance between a location sensor and a sensing device (e.g., iOS or Android smartphone or tablet) by using an indoor path loss model. The RSS values, calculated distance, calculated bearing (e.g., angle) with respect to the location sensors, and other unique identifying information can be used by trilateration/triangulation or fingerprinting techniques to achieve indoor localization.

Traditional fingerprinting techniques consist of collecting identity information (e.g., MAC addresses or RSS indicator) from location sensors within range of a sensing device in a grid-based fashion, where the size of the grid cells correspond to the accuracy required by the selected positioning technique. This identity information is recorded along with the exact location where these readings were taken in the grid, and stored in a database for future retrieval. The readings from this offline phase, known as the fingerprinting training phase, are used to determine the current location of a sensing device by comparing current readings with the ones stored in the database using a probabilistic or classification algorithm (e.g., Naive Bayes, K-nearest neighbor, or K-means clustering). However, the offline training phase is very labor intensive, and the accuracy of the localization algorithm is directly proportional to the amount of training data collected (the greater and fine-grid the data collection is, the better the accuracy) during the training phase. If a location sensor is moved or replaced, training data needs to be recollected.

Conventional trilateration and triangulation techniques, on the other hand, do not require a fingerprinting training phase or dense collection of identity information from location sensors at known locations throughout a site. Conventional trilateration techniques typically require at least the exact known locations ((X, Y) coordinates) of the location sensors, and the distances between the location sensors and the sensing device. Similarly, conventional triangulation techniques typically require at least the exact known locations ((X, Y) coordinates) of the location sensors, and the bearing (e.g. angle) of the sensing device relative to the location sensors. This information is stored in a database and used along with a distance calculated between a location sensor and a sensing device to estimate the current location of the sensing device.

For example, one illustrative and conventional Wi-Fi trilateration technique uses signal strength to calculate the distance between a Wi-Fi access point (AP) and a sensing device. The estimated distance is then used to define an area around a Wi-Fi AP. If three APs are within range, their areas will intersect at a point common to all three. This point is the predicted location of the sensing device. However, the estimated distance using trilateration depends on the RSSI values. If there is sufficient interference or signal obstruction, the RSSI will vary greatly and the distance calculated between a sensing device and a location sensor might not be correct (in particular, will contain a large distance conversion error).

Notably, none of the foregoing independent or hybrid fingerprinting/trilateration/triangulation techniques are cognitive and able to take into account user feedback regarding the result of the techniques. The presently described inventive concepts leverage the notion of dynamic, cognitive hybrid techniques for indoor positioning, and are capable of improving over time, even adapting to the particular environment (and any associated changes that may occur over time) to improve users' ability to navigate throughout the indoor space.

Accordingly, the presently disclosed inventive concepts represent an improvement over conventional fingerprinting and/or trilateration/triangulation-based positioning techniques. Specifically, by using a hybrid positioning engine that uses a site's existing wireless technologies (e.g. Bluetooth 4.0, Wi-Fi, Bluetooth Low Energy (BLE) beacons, or combinations of the foregoing and/or equivalents thereof), and optionally inertial sensor data (e.g. such as generated by an accelerometer, magnetometer, and/or gyroscope) from a sensing device, to provide indoor localization, navigation, or both. The location sensor data is utilized in a fingerprinting and trilateration or triangulation technique to improve the overall accuracy of the proposed indoor sensing and positioning engine. Based on the current indoor wireless infrastructure and layout of a site (e.g., open spaces, or hallway areas), the hybrid engine computes the current location of a sensing device using the two aforementioned techniques.

The inventive concepts presented herein according to various embodiments, convey the following advantages in the context of indoor location sensing and/or navigation: (1) improved localization accuracy; (2) integration of multiple sensors; (3) dynamic switching between the two positioning techniques (fingerprinting and trilateration/triangulation) based on the indoor layout, or fusion of both techniques, as needed, to improve the overall accuracy of the positioning process; and (4) dynamic improvement based on current and/or historical feedback from users, which is used to learn over time about the best positioning technique for a given location and/or modify individual positioning techniques for a given location.

In various approaches, the feedback may be provided by the user interacting with a sensing device, e.g. a GUI configured to facilitate indoor location sensing and/or mapping as part of a dedicated mobile application or service. The user feedback may include, e.g. quantitative ratings and/or qualitative comments regarding parts of the solution or paths suggested by the location sensing system. In one embodiment, quantitative ratings include a rate of success for the given solution/path.

Moreover, the inventive concepts described herein utilize feedback to improve location accuracy and/or adapt to changes in the specific environment, irrespective of what was determined to be used by the cognitive prediction functionality. For instance, in various embodiments user feedback may be current in the sense that a user is or has very recently navigated the space and provided feedback in regard thereto. The user feedback may also include historical feedback from previous collection sessions, previous layouts (which may or may not be valid presently), etc. as would be understood by a person having ordinary skill in the art upon reading the present descriptions.

The proposed system includes of three main phases: (1) collection of fingerprinting training and trilateration/triangulation data, (2) indoor layout classification based on the fingerprinting training data, and (3) technique selection (triangulation, trilateration, fingerprinting, or combinations thereof) based on the layout estimation, and a similarity or error score metric.

Collection of Fingerprinting Training Data, Triangulation Data, and/or Trilateration Data In the fingerprinting data collection phase, the user is required to collect location sensor training data (e.g., location sensor unique identifying information, received signal strength indicator (RSSI) values, MAC addresses, etc. as would be appreciated by a person having ordinary skill in the art upon reading the present disclosure) at known locations throughout an indoor site, in one embodiment.

For instance, according to one exemplary approach, fingerprinting data collection may involve the following. The user designates a make and model of a location sensor (e.g. a BLE beacon for the preferred embodiment) that is to be used for the deployment, ideally from a catalog or other publicly available source of such location sensors. The system is equipped with knowledge base (KB) including operational characteristics of various types of location sensors suitable for use in a location sensor network, e.g. a system of location sensors. If the KB includes such a priori knowledge and/or experience regarding operational capabilities of the particular type of device designated by the user, a deployment template of best practices for inter-device distances for various space configurations is available to the system and may determine, or be used to guide, the location sensor deployment process. If no such a priori knowledge is available, a new entry is created in the KB for the new device type.

The user starts at a point in the target deployment space, and deploys the first location sensor. The user then walks slowly away from that point. The system continuously monitors signals received from the first location sensor, e.g. using a mobile device held by the user during the deployment process. When the user reaches a known inter-location sensor separation distance, or a signal with questionable signal strength indicator is received by the sensing device (whichever comes first) the system directs the user to deploy the second location sensor.

After the second deployment, the system senses signals from two location sensors. The foregoing process repeats in substantially the same manner, and a new sensor deployment is instructed after the user reaches a known inter-location sensor separation distance; or a signal with questionable signal strength indicator is received by the sensing device (whichever comes first) the system directs the user to deploy the third location sensor.

After the third deployment, the system estimates a shape of the target deployment space. The estimated geometrical shape of the space is calculated from strong and weak RSSI readings measured as the user walks the space and deploys location sensors. Furthermore, previous deployment templates, if available in the knowledge base (KB), serve as a priori knowledge to fine tune the estimated shape of the target deployment space. This brings into play additional intelligence, gleaned from prior deployments for such a space shape, about preferred location sensor deployment points.

The foregoing procedure is repeated until the user has walked the requisite route of the space, e.g. as may be determined with reference to a predetermined threshold amount of the environment. For example, in one embodiment, at a minimum the user will have visited all accessible vertices (e.g. as occurring near or at various corners, doorways, walls, outcroppings, etc.) of the location. In another embodiment, a user will have visited at least a minimum threshold amount of the total area of the location, such as one third of the total area, one half of the total area, two thirds of the total area, etc. depending on the geometry of the location and the desired sensor coverage. In still more embodiments, a user will have visited all areas of interest of the location, and/or all accessible areas of interest, such as rooms, hallways, stairwells, auditoriums, etc. as would be understood by a person having ordinary skill in the art upon reading the present disclosure. Preferably, the user should have walked most, if not all, of the indoor location, including enclosed space(s) of interest.

As each location sensor is deployed, the system also refines its estimation of the shape of the deployment space. The output of the process then is (a) an estimated map constructed from the RSSI readings where the user walked and (b) recommended points at which location sensors are to be deployed in real-time (and preferably which type of location sensor should be deployed at each respective point, as well as an optional minimum remaining battery level or power level of the location sensor).

In the trilateration/triangulation data collection phase, instead of collecting training data at known locations throughout a site (e.g., every 1-2 meters), the user is only required to record the exact (X, Y) location of the sensors and each sensor's unique identifying information, in another embodiment.

The data from these training phases is stored, preferably in the cloud, for future retrieval and usage, in various embodiments.

Indoor Layout Estimation and Classification

In the layout estimation phase, the fingerprinting training data is used to estimate the indoor layout. Based on the density of location sensors and their locations, the goal of this phase is to classify the fingerprinted indoor environment as open-space (e.g. warehouse or auditorium layout), closed-space (e.g. office layout with corridors), or other undetermined spaces (e.g. staircases). This is accomplished by looking at the signal range of each individual location sensor, and measuring how much their ranges overlap. The intersection of location sensor signals is greatest when the location sensors are close to each other (if the signals tend to overlap beyond a threshold, then the indoor space is classified as an open space). However, depending on the location sensor static location, the location sensor signal range will vary dramatically (this is due to obstructions and interference from nearby objects).

Figure 3A:
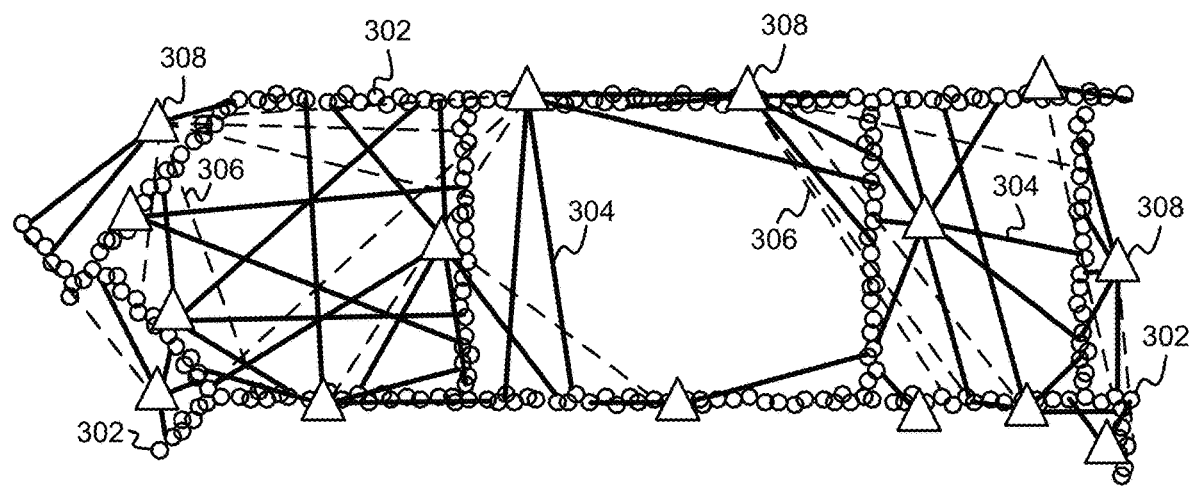
FIG. 3A is a graphical illustration of putative connections in an indoor environment, according to one embodiment.

In a preferred approach, indoor layout estimation is performed substantially in accordance with the following descriptions, and reference to the FIGS. 3A-4.

Indoor layout estimation requires two inputs: training data collected during the fingerprinting stage, and actual location of beacons deployed within the space. Given these inputs, the algorithm iterates through the training data and compares signal characteristics between readings taken during fingerprinting and the actual location sensor location to a minimum signal threshold. In this manner the relative signal strength between a given location sensor and a given point in the indoor environment can be evaluated and represented graphically. The algorithm performs such a comparison for each location sensor and each location represented in the training data resulting in a map illustrating signal strength between the location sensors and the various locations in the indoor environment.

For instance, and with reference to FIG. 3A of the presently disclosed inventive concepts, a graphical representation of a result of iterating over fingerprinting data to represent relative signal strength at various locations and relative to various location sensors is shown, according to one embodiment. In accordance with FIG. 3A, each circle 302 represents a data point collected during fingerprinting, e.g. one of the members of $B^{\{offline\}}$ shown in FIG. 4A and discussed with reference thereto below. The data points preferably include at least an identifier of the location sensor 308 (preferably a BLE beacon) with which the data point was generated, an indicator of signal strength (e.g. relative received signal strength indicator (RSSI)), and are annotated with an (X, Y) location coordinates identifying the precise location within the environment where the data point was gathered.

As noted above, connections between various data points (circles 302) and location sensors 308 may be represented by lines indicating relative signal strength. For example, as shown in FIG. 3A, thin, dashed lines 306 represent connections with weak signal strength (i.e. below a minimum signal strength threshold $\delta$) while thick, solid lines 304 represent connections with strong signal strength (i.e. equal to or above the minimum signal strength threshold $\delta$). For sake of clear representation and reproduction, the number of lines represented in FIG. 3A is significantly reduced from a similar mapping produced in practice. Skilled artisans will appreciate that, in preferred embodiments, a map such as shown in FIG. 3A includes a line between each location sensor 308 and all surrounding data points 302 within range of the location sensor 308.

Figure 3B:
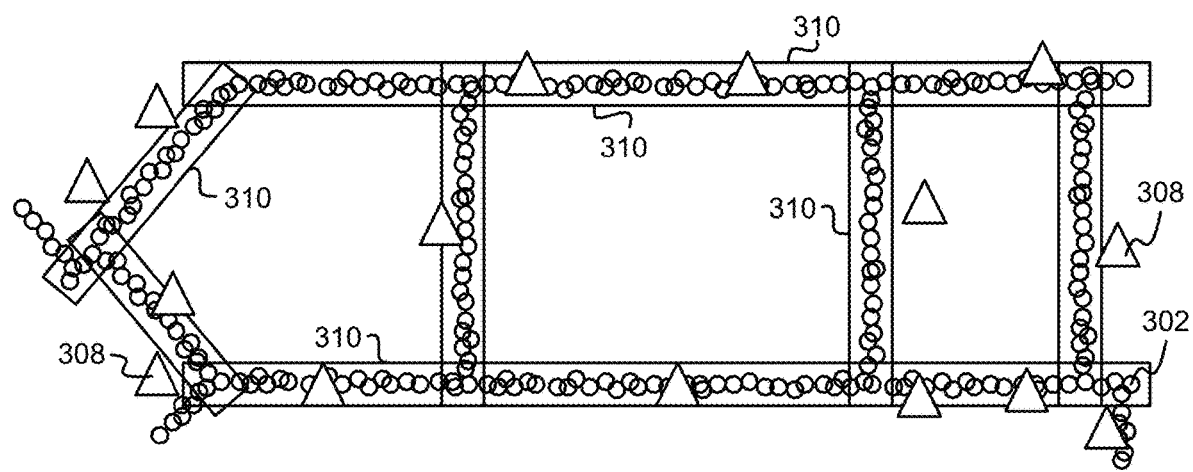
FIG. 3B is a graphical illustration of an estimated layout of the indoor environment shown in FIG. 3A, according to one embodiment.

Based on the signal strength mappings as shown in FIG. 3A, a general shape of various regions of the environment may be estimated, e.g. using a convex hull algorithm such as a Graham scan or Quickhull procedure, or any suitable known clustering algorithm, in various approaches and as would be appreciated by a person having ordinary skill in the art upon reading the present descriptions. An exemplary result is shown in FIG. 3B, generated using the connection data indicated in FIG. 3A, according to one embodiment. A plurality of walls 310 are defined by one of the aforementioned algorithms, delineating different areas such as hallways, open spaces and/or inaccessible areas therebetween.

Additional details of the layout estimation and classification process are described in greater detail elsewhere herein, particularly with reference to Algorithm 1 and FIG. 4A.

Exemplary pseudocode for estimating a layout of an indoor location is given in Algorithm 1, and shown in FIG. 4A, according to one embodiment. Algorithm 1, takes as input a set $\{B^{offline}\}$ of annotated location sensor readings as training data, where $\{B^{offline}\}$ includes location sensor data collected during an expert training session (or multiple such sessions) annotated with (X,Y) coordinates; a set $\{B^{static}\}$ of deployed location sensors for a given area, where $\{Bs^{static}\}$ includes location sensor ID information and known (X,Y) coordinate locations of the location sensors within the test environment; an initial geometric map M; a signal threshold $\delta$ defining a minimum threshold below which signals are considered "weak"; a minimum density threshold $\rho_{min}$; and a minimum crossing threshold $\chi_{min}$ (lines 1-2). The threshold $\delta$ may be set to a value determined during training, or another value manually set by a user. For each annotated data point in $\{B^{offline}\}$, identify a corresponding location sensor in $\{B^{static}\}$ and draw a line between the two. The type of line drawn between each $B^{offline}$ && $B^{static}$ based on the received signal strength for the respective location sensor pair. As shown in Algorithm 1, a first type of line (e.g. solid, black, green, etc.) indicates the received signal strength (e.g. RSSI) is $>=\delta$; while a second type of line (e.g. dotted, dashed, red, etc.) indicates the received signal strength is $<\delta$. For instance, in one exemplary embodiment, the RSSI of beacon A at 0 meters is −55, and the threshold is set to −70 X meters away from beacon, then any RSSIs$>=-70$ ([−55, −70]) are considered strong signals. Any RSSI beyond the threshold −70, e.g., −72, is considered weak since −72<−70.

In another embodiment, lines of the first type represents the case in which the received signal strength between a sensing device and a location sensor is greater than or equal to some minimum threshold, t. This represents connections where the signal strength is strong. On the other hand, lines of the second type represent the case in which the received signal strength between a sensing device and a location sensor is less than a threshold, t. This corresponds to connections where the signal strength is weak (possibly due to interference between the sensing device and location sensor (e.g., walls, obstacles, machine, Wi-Fi AP)).

In such embodiments, the value t is defined by either a value learned from training data, δ, or a value K set by the user, where $$t = \begin{cases} \geq \delta, \text{ or } \overline{K} \\ < \delta, \text{ or } K \end{cases}$$

and K is a threshold that decouples strong signals and weak signals ($\overline{K}$ is a value other than K). In several exemplary embodiments the RSSI (e.g., in one approach according to IEEE 802.11) is a relative index, expressed in decibels (dB), that measures the relative quality of the received signal strength of a device.

With continuing reference to FIG. 4A and Algorithm 1, once connections (lines) between each $B^{offline}$ && $B^{static}$ (drawn), regions defining various area types may be defined using known convex hull algorithms such as Graham scan or Quickhull, or known clustering algorithms such as K-Means clustering or Density-Based Spatial Clustering of Applications with Noise (DBSCAN), in exemplary approaches (line 7). Other known clustering algorithms, convex hull algorithms, or equivalents thereof that would be appreciated by a person having ordinary skill in the art may be employed in other approaches without departing from the scope of the present disclosure.

The regions may be classified into the various area types using one or more filters or thresholds evaluating density of connections (lines) and/or overlap of lines (crossings) therebetween in a given region (line 8). As understood herein, density refers to "amount per unit area" since we are dealing with two-dimensional spaces in the context of Algorithm 1. Exemplary area types may include, but are not limited to: hallways, defined as dense first line type areas, e.g. having a density of first type lines above a minimum density threshold $\rho_{min}$ and sparse second line type crossings, e.g. regions having a number of crossings below a minimum crossing threshold $\chi_{min}$; walls: defined as dense second line type crossings, e.g. regions having a number of crossings above a minimum crossing threshold $\chi_{min}$ and sparse first line type areas, e.g. having a density of first type lines below a minimum density threshold $\rho_{min}$; and open spaces: defined as empty areas, e.g. regions without any fingerprinting training data, and/or dense first line type regions, e.g. regions having a density above a minimum density threshold $\rho_{min}$ and dense second line type crossings, e.g. regions having a number of crossings above the minimum crossing threshold $\chi_{min}$.

Referring again to Algorithm 1, and FIG. 4A, the areas may also be labeled and/or rendered, e.g. using any suitable auto sketch functionality and/or techniques (line 9).

Optionally, (line 10), the user may be provided a draft or rendering of the map, the map preferably including regions and area types assigned thereto. Users may correct the auto-generated rendering, e.g. by manually dragging various points/vertices of the initial shape to redefine/correct into a final shape.

Whether manual adjustment of the generated map occurs or not, Algorithm 1 as shown in FIG. 4A includes labeling the completed map based on sparsity of the different regions/areas therein (line 11). The labels include "open space," "closed space," and "undetermined" in one embodiment. Of course, other labels may be included, and may be assigned based on different criteria besides, or in addition to, sparsity, in various embodiments. For example, areas may be labeled according to distance from another area, e.g. an entrance or exit, a lunchroom, a restroom, etc. Areas may further, or alternatively, be defined according to the number of location sensors present, location sensor coverage, or other operational characteristics of the location sensors.

Algorithm 1 completes, and returns a geometric map M of the corresponding area requested by the user, and based on the various inputs of location sensor data (training) and bulk location sensor data (testing). The map M includes all associations between location sensor (X, Y) coordinates and corresponding annotated location sensor readings (training data). Accordingly, the map M may be utilized to generate suggestions for optimal location sensor locations using various different sensor types and with different characteristics (e.g. battery life, broadcast rate, new/used status, expected lifetime, or any other characteristics that may be understood by a person having ordinary skill in the art upon reading the present disclosures) and guide a user through a cognitive process for deploying a location sensor network, in one embodiment.

The map M may itself be an endpoint in some embodiments, but may also be utilized to assist a user in deploying location sensors of various types, operational characteristics, battery levels, broadcast rate, expected lifetime, new/used status, etc. in an indoor environment to provide or optimize a location sensor network, in preferred approaches.

Advantageously, employing the presently described inventive concepts yields practical benefits in the context of operational cost for indoor location sensing solutions. For example, by making suggestions not only as to where location sensors should be located, but what type of location sensor (e.g. based on location sensor characteristics such as those mentioned above) to deploy at a given location, overall operational lifetime of the indoor location sensing network may be extended, and/or other operational parameters tuned, such as signal coverage, in one embodiment.

To illustrate the operation and advantages of the inventive concepts disclosed herein, according to one exemplary embodiment, the inventors collected training data in various indoor spaces, e.g. different floor plans that include large open space areas or areas with hallways, and, using this training data, evaluated the geometric map generation process of the presently disclosed inventive cognitive progressive methods and systems, the results of which are discussed below.

According to various embodiments, a training data set includes of a set of location sensor readings, e.g. beacon readings, collected at (X, Y) locations in a space equipped with appropriate location sensors. The remaining discussion of the exemplary, experimental embodiment will refer to location sensors as "beacons" but it should be appreciated that in various embodiments other location sensor types may be employed without departing from the scope of the inventive concepts presented herein. The identifying information and suitable signal strength (or other equivalent information/measures) may differ for different location sensor types, but tailoring the inventive concept as presented below with respect to beacons to other location sensor types should be considered within the scope of the present disclosure.

At any rate, for each (X, Y) location, a beacon's identifying information and other information (e.g., relative received signal strength indicator (RSSI)) sensed by a sensing device (e.g., an iOS device) are saved along with a current timestamp and (X, Y) location of where the measurements were sensed/taken. The training data may be utilized to provide a set of known locations within a given space, e.g. an indoor space, the known locations corresponding to various location sensors deployed throughout the space.

The known locations may be utilized to determine location of other objects, and/or sources of signal interference, throughout the 2-dimensional or 3-dimensional space. For example, assume the sensing device sensed 4 beacons at a location, but 3 out of the 4 beacons' RSSIs could not be determined. However, the remaining beacon was sensed and RSSI could be determined (as for group 3 in Table 1 below).

For a given (X, Y) location, the set of beacons sensed at that location might be in range or out of range, as determined by some threshold or known quantity. If the beacons are out of range, this might be due to some interference present in the space (e.g., walls, obstacles). Out of range beacons can mean two things: (1) a beacon is located too far away that the sensing device cannot sense it at all; and/or (2) a beacon is located a distance away from the sensing device such that the signal is noisy and the visibility of the beacon's signal is intermittent. To demonstrate this notion, Table 1 shows exemplary beacons' identifying information and other information for 3 different locations that were sensed at the given (X, Y) location, according to one experimental embodiment.

For each set of beacons sensed at the given location, identifying information (including, but not limited to, major ID, minor ID, and/or UUID, in any combination), RSSI, and timestamp are determined, as shown in Table 1. For example, at (X, Y)=(375, 274), 4 beacons were sensed. Only 1 beacon has a valid/usable RSSI reading. It is important to note that the number of beacons per set/group may vary. For example, in a preferred embodiment a set/group of beacons is defined as the number of beacons detected at a given location at a given instance in time. For example, only 2 beacons were sensed at location (374, 127) at time 20:50:56+0000, whereas 4 beacons were sensed at location (378, 253) at time 20:51:09+0000. Of course, other ways of defining beacon groups/sets may be employed without departing from the scope of the present application.

TABLE 1

Exemplary Beacon Readings Annotated by (X, Y) Coordinate and Timestamp

| Set/Group ID | (X, Y) | Timestamp | Beacon ID (major:minor) | RSSI |
|---|---|---|---|---|
| 1 | (374, 127) | 20:50:56+0000 | 3:7 | −96 |
|  |  |  | 3:11 | −89 |
| 2 | (378, 253) | 20:51:09+0000 | 3:1 | 0 |
|  |  |  | 3:7 | −97 |
|  |  |  | 3:11 | 0 |
|  |  |  | 3:12 | 0 |
| 3 | (375, 274) | 20:51:11+0000 | 3:1 | −90 |
|  |  |  | 3:7 | 0 |
|  |  |  | 3:11 | 0 |
|  |  |  | 3:12 | 0 |

As shown in Table 1 above, for each set of beacons sensed, the RSSI may not always be useful. For example, for set ID 2, beacon IDs 3:1, 3:11, and 3:12 have an RSSI of 0. This could mean that the sensing device could sense the beacon (e.g. able to read, acquire, or otherwise derive from the received signal a major and minor ID) but not all beacon packets were received within a 1-second cycle; or for some unknown reason, the RSSI could not be determined. This is the behavior that has been observed, according to one exemplary embodiment, for an iOS device, but may be different for other devices (e.g., Android or Raspberry Pi device, etc. as would be understood by a person having ordinary skill in the art upon reading the present disclosure). However, the RSSI threshold that determines when a beacon is within range or not can be learnt from the training data or using known methods. Reaching this noisy "threshold" RSSI value could be due to the beacon being on the other side of a wall or an obstacle causing some sort of RF interference.

It is possible to extrapolate the geometry of various spaces by representing as lines all connections between beacons and training points as follows: Case 1: All connections where a beacon was sensed but it reached a noisy RSSI threshold value or RSSI could not be determined. Case 2: All connections where a beacon was sensed and the RSSI could be determined and was within the boundaries of a specified threshold.

By looking at the density of signal connections drawn according to the binary classification above, the geometrical shape of a space can be inferred as: (1) a closed space, if: the density of strong signals is more prominent in areas that are more accessible (e.g., hallways, walkable spaces, doorways, etc.) than the current location (where "prominence" is synonymous with "greater than", such that a density of strong signals is more prominent than other areas if the given area has more strong signals per unit area than the respective "other area"); and/or the density of weak signals is more prominent in areas that are not accessible (e.g., across a room, through walls, etc.) than the current location; (2) an open space, if: a density distribution of strong and weak signals differ, e.g. a distribution characterized by a ratio of strong to weak signals in a range from about 70:30 or 80:20, etc. in various embodiments and as would be appreciated by a skilled artisan upon reviewing the instant disclosure; and (3) an undetermined space, if: a density distribution of strong and weak signals is about the same, e.g. a distribution characterized by a ratio of strong to weak signals in a range from about 40:60 to about 60:40, preferably in a range from about 45:55 to 55:45, and most preferably a ratio of about 50:50, according to various embodiments and within the given location.

Selection of Optimal Indoor Localization Technique

Based on the estimated layout and classification, the inventive concepts presented herein include determining which indoor localization technique to use: fingerprinting, trilateration/triangulation, or both. In preferred embodiments, the data used for indoor localization correspond to the indoor environment for which position sensing is to be provided, and in particularly preferred approaches both fingerprinting training data and trilateration/triangulation data corresponding to the indoor environment are received.

According to a preferred embodiment of the presently described inventive concepts, the indoor localization technique may be chosen based in whole or in part on a classification of a corresponding region or area of the indoor environment, or may be chosen based in whole or in part on the number of location sensors sensed during the online phase. If the number of location sensors sensed is greater than 0 and less than 3, the positioning engine uses the fingerprinting offline and online data.

However, if the number of location sensors sensed is greater than or equal to 3, and if the indoor layout is classified as open-space, the positioning engine uses a trilateration or triangulation technique; on the other hand if the layout is classified as closed-space, the positioning engine uses the fingerprinting offline and online data with a classification algorithm (e.g., K-nearest neighbor) to determine the current location; in any other cases, a fusion of these two techniques is implemented using a similarity score metric, e.g. Euclidean distance, Manhattan distance, etc. that quantifies the difference between both techniques and seeks to find the solution with the least amount of difference, such that the dissimilarity computed between the trilateration/triangulation solution and the classification algorithm set of solutions is 0 or close to a predefined minimum difference threshold, which may be learned from training data or specified by the user, in various approaches.

In accordance with several illustrative examples of the foregoing approach, the difference threshold, for example, may be predefined to a value of about 0.5 meters, about 1 meter, about 1.5 meters, a value of about 2.0 meters, a value in a range from about 0 meters to about 1 meter, etc., and depending on an amount of distance desired for the solutions from the respective algorithms. Preferably, the difference threshold is learned from training data or specified by the user.

The selected technique(s) is/are used to estimate the location of a user's sensing device within the indoor environment, e.g. as described hereinabove. The user's location may be refined by using multiple techniques in dynamic fashion, e.g. by switching between two or more techniques as a user moves throughout the environment to first obtain a relatively coarse location estimate (e.g. using fingerprinting) and then a refined estimate (e.g. using trilateration/triangulation). This dynamic approach avoids the need to use more tedious and computationally expensive fingerprinting techniques at all stages of navigation, improving efficiency of the resulting navigation service/product.

As mentioned above, based on precise, continuous (or periodic, e.g. every half second, second, 3 seconds, etc.) tracking of a user's location, and given: (1) a desired destination; and (2) knowledge regarding the layout of the indoor location (as may be obtained from the fingerprinting training data and/or layout estimation discussed above) the presently disclosed inventive concepts may provide navigation services to a user attempting to navigate through an indoor environment. The general flow of events for providing navigation services using the inventive concepts presented herein is as follows.

During an offline phase, fingerprinting training data (location sensor's identifying information (UUID, MajorID, and MinorID), received signal strength indicator (RSSI) values, and known (X, Y) locations where training data was recorded) is collected along with the data needed by the trilateration/triangulation technique ((X, Y) location sensor locations, and location sensor's identifying information). Once this data is recorded, it is uploaded to the cloud. The cloud processes the data and, based on the information collected, determines the layout of the indoor environment.

During an online phase, a sensing device collects location sensors' (preferably BLE beacons') identify information and corresponding received signal strength indicator (RSSI) values. This information is relayed to a classification algorithm, which, in conjunction with the data collected during the offline phase, is used to determine a set of location predictions.

The results from the classification algorithm, and the estimated layout are then relayed to a Hybrid Indoor Sensing and Positioning Engine. Based on the estimated layout type and number of location sensors sensed, the engine determines (using a similarity score metric as noted above) which technique to use in order to determine the most accurate coordinate location of the sensing device. The engine may use either technique, or both, based on the results from the scoring metric, in various approaches.

For instance, in one illustrative embodiment a Hybrid Indoor Sensing and Positioning Engine may perform a procedure substantially as represented by Algorithm 2, shown in FIG. 4B. In accordance with Algorithm 2, a set of annotated location sensor readings determined using a fingerprinting approach $\{B^{offline}\}$, a set of location sensor readings at time t $\{B^{online}\}$, and a set of geometric maps estimated from location sensor readings $\{M^i\}$ are provided as input.

With continuing reference to Algorithm 2 and FIG. 4B, at initialization, Algorithm 2 initializes the output parameters to a special value, e.g. Infinity or Not a Number (NaN), where the special value is used to differentiate between a valid solution, e.g. a solution returned by fingerprinting and/or triangulation/trilateration, and a solution that does not exists or could not be determined, e.g. no location sensors sensed at all or online location sensor readings do not match the current geometric map readings. The output parameters include a predicted (X', Y') location; map ID or name of the map where location sensor readings were collected, if available; floor ID or floor number that identifies a floor where location sensor readings were collected, if available; and latitude and longitude coordinates representation of the predicted (X', Y') location, if available.

With the initial values defined, and input provided, the algorithm involves determining, for each reading in $\{B^{online}\}$, whether any of the maps in the set of geographic maps $\{M^i\}$ include a location sensor with an ID matching a location sensor ID corresponding to a location sensor reading in $\{B^{online}\}$. If so, one or more positioning techniques may be determined.

Generally, if the location sensor IDs in a given map in $\{M^i\}$ match the IDs in $\{B^{online}\}$, and if the number of $\{B^{online}\}$ greater than zero but less than three, fingerprinting is determined as an optimal positioning approach to employ.

Conversely, if the location sensor IDs in a given map in $\{M^i\}$ match the IDs in $\{B^{online}\}$, and if the number of $\{B^{online}\}$ readings is three or more, the type of space (e.g. open space) in the corresponding geometric map belonging to $\{M^i\}$ is evaluated to determine an optimal positioning approach.

If no location sensor IDs in a given map in $\{M^i\}$ match the IDs in $\{B^{online}\}$, then the algorithm terminates because no location sensor readings match the map and comparing the two is not informative (or worse, misinformative). Similarly, if the number of location sensor readings in $\{B^{online}\}$ is 0, then the algorithm terminates because there are no location sensor readings to match/compare against the map's readings.

If the space is classified as "open," trilateration/triangulation is preferred, and more preferably values for X', Y' are determined using trilateration/triangulation.

If the space is classified as "closed," fingerprinting is preferred, and more preferably values for X', Y' are determined using fingerprinting.

If the space classification is "undetermined," a combination of fingerprinting and trilateration/triangulation is preferred, and more preferably values for X', Y' are determined using each technique. To find the optimal location among these techniques, a similarity score or error metric as described elsewhere herein is determined for each position using a similarity score metric, e.g., Euclidean distance, etc. as described herein and as would be understood by a person having ordinary skill in the art upon reading the present disclosure. The position having the smallest distance between results achieved using the similarity/error measures is chosen as the optimal location.

If the area is classified other than "open," "closed" or "undetermined", then Algorithm 2 utilizes fingerprinting to estimate the position of the location sensor readings within $\{B^{online}\}$.

Whatever technique is ultimately employed, if sufficient location sensors, readings, etc. were available to perform at least one of the techniques, then an optimal location (in X, Y coordinates), a corresponding map ID from $\{M^r\}$ for which positioning was performed, latitude/longitude coordinates corresponding to the optimal location, and floor ID are returned as output. The map ID, latitude/longitude coordinates, and floor ID are determined from the identifying information collected about the location sensors.

Accordingly, the presently described inventive concepts may be embodied in many forms, each of which may be combined in any suitable manner or permutation that would be understood as acceptable by a person having ordinary skill in the art upon reading this disclosure. In preferred approaches, the invention is embodied in at least two complementary implementations. A first implementation, represented by method 500 and FIG. 5, discussed in greater detail below, is directed to determining optimum positioning techniques to use in various different locations. On the other hand, a second implementation represented by method 600 and FIG. 6, also discussed in greater detail below, is directed to the complementary notion of providing navigational services within an indoor environment using the optimal set of positioning techniques. Each embodiment, which shall be understood as fully capable of use with the other, is addressed in turn in the following sections.

Figure 5:
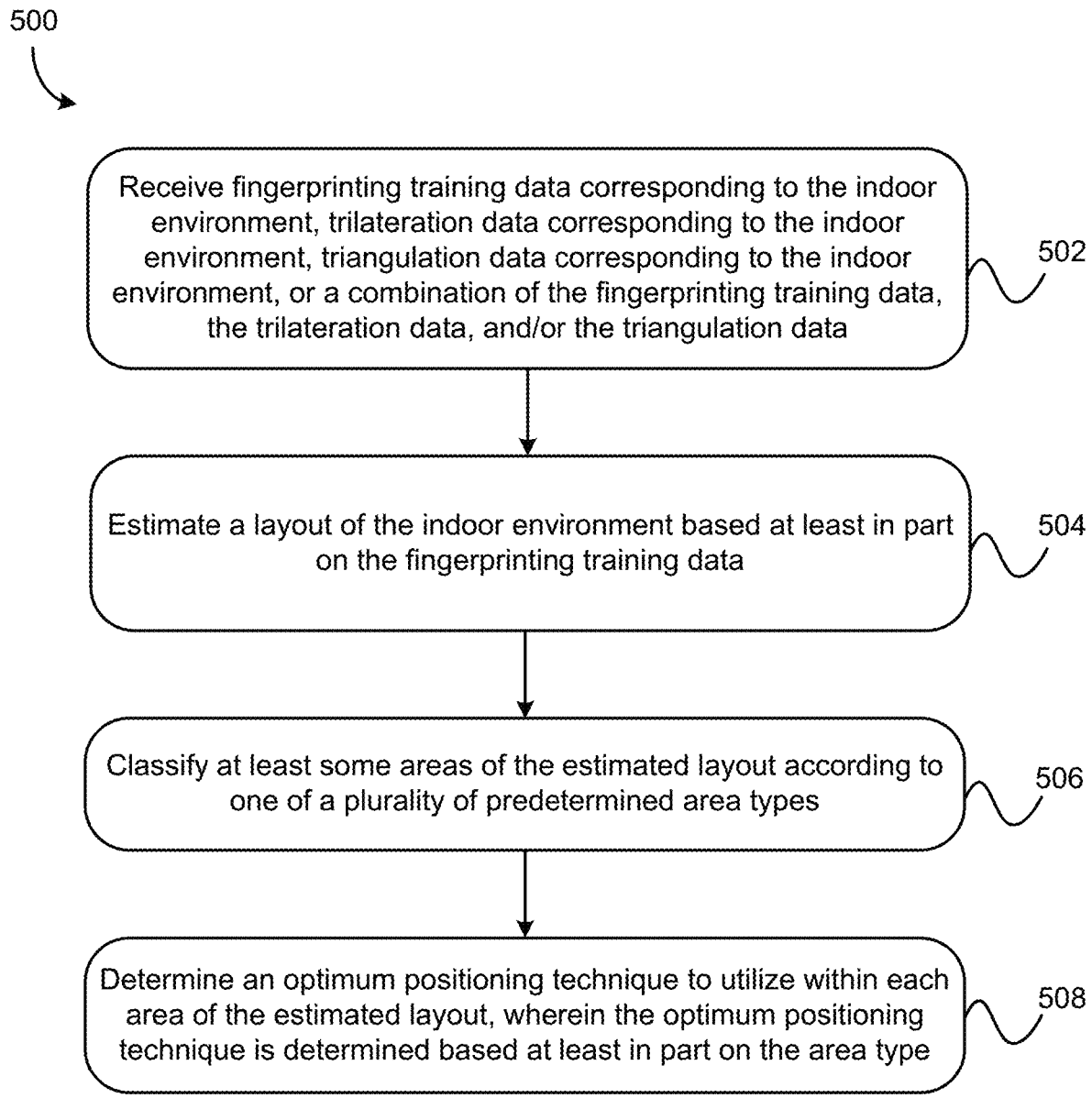
FIG. 5 illustrates flowchart of a method for dynamic, cognitive, hybrid indoor sensing and positioning, in accordance with one embodiment.

Accordingly in FIG. 5 a method 500 for dynamic, cognitive hybrid positioning within an indoor environment is shown according to one embodiment. The method 500 may be performed in accordance with the present invention in any of the environments depicted in FIGS. 1-4, among others, in various embodiments. Of course, more or less operations than those specifically described in FIG. 5 may be included in method 500, as would be understood by one of skill in the art upon reading the present descriptions.

Each of the steps of the method 500 may be performed by any suitable component of the operating environment. For example, in various embodiments, the method 500 may be partially or entirely performed by a mobile device, or some other device having one or more processors therein. The processor, e.g., processing circuit(s), chip(s), and/or module(s) implemented in hardware and/or software, and preferably having at least one hardware component may be utilized in any device to perform one or more steps of the method 500. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 5, method 500 may initiate with operation 502, where fingerprinting training data, trilateration and/or triangulation data, are received. The data correspond to the indoor environment for which position sensing is to be provided, and in preferred approaches fingerprinting training data, trilateration and triangulation data corresponding to the indoor environment are received. The data may be received at any suitable location capable of performing position services, such as a server, a mobile device, a workstation, or any other device having suitable storage capacity, processing power, and network communication capabilities, as would be understood by a person having ordinary skill in the art upon reading the present disclosure. Moreover, the data may include the exemplary forms of training fingerprinting data, trilateration data and triangulation data discussed above in the subsection entitled "Collection of Fingerprinting Training Data and Trilateration/Triangulation Data."

For instance, in one approach fingerprinting training data comprise identifying information of a location sensor to which the fingerprinting data correspond; received signal strength indicator (RSSI) information concerning a signal received by the sensing device; an (X, Y) location corresponding to the location of the sensing device, when collecting the fingerprinting data; and a timestamp corresponding to a time of receipt of the signal by the sensing device.

In another approach, trilateration data comprise at least a plurality of (X, Y) coordinates each corresponding to the location of a location sensor deployed throughout the indoor environment, and the distances between the location sensors and the sensing device.

In yet another approach, triangulation data comprise at least a plurality of (X, Y) coordinates each corresponding to the location of a location sensor deployed throughout the indoor environment, and the bearings of the sensing device relative to the location sensors.

Operation 504 involves estimating a layout of the indoor environment based at least in part on the fingerprinting training data. Operation 504, in preferred approaches, may include any feature, functionality, or operations described herein, particularly in the foregoing subsection entitled "Indoor Layout Estimation and Classification" according to various embodiments.

With continuing reference to FIG. 5, in operation 506 at least some areas of the estimated layout are classified according to one of a plurality of predetermined area types. The classification process may include evaluating density of various connection types, e.g. strong, weak, or no connection, between various location sensors and various locations throughout the indoor environment. In preferred approaches, classification is based on a density of connections within various regions/areas of an indoor environment such as shown and described hereinabove with reference to FIGS. 3A-3B.

Moreover, in various approaches the predetermined area types are selected from the group consisting of: inaccessible spaces, closed spaces, opens spaces, walls, hallways, and undetermined spaces. Of course, other types of areas may be defined according to signal dynamics within the indoor environment and may be included in the foregoing list in addition to, or instead of the members expressly recited without departing from the scope of the presently described inventive embodiments.

Moreover still, and regarding the manner of classifying areas, the predetermined area types, according to one approach, are classified according to one or more factors selected from the group consisting of: a density of connections characterized by strong signal strength within a predetermined area; a density of connections characterized by weak signal strength within the predetermined area, and combinations thereof. As will be understood by those having ordinary skill in the art, density of connections of a particular type may indicate presence of obstacles, such as walls, other people, other signals, etc. and may be utilized to infer the type of area covered by the corresponding signals.

For instance, in one embodiment open areas tend to be characterized by a high density of connections with strong signal strength crossing the interior region thereof (since there is little to interfere with signal transmission across the open area). Accordingly, regions with a certain minimum threshold number of connections which demonstrate strong signal within the area of the region are designated as "open spaces."

On the other hand, some open spaces are characterized by substantially no connections, e.g. when the location sensors are too far away from any sensing device. Accordingly, these two criteria may be used to classify spaces as "open" based on connection type and density, in one embodiment. Inaccessible areas also tend to be characterized by a lack of connections, so one must take care not to confuse an open area such as an atrium with an inaccessible one, such as a condemned section of a building.

Conversely, closed spaces tend to be characterized by a relatively high strong signal connection density within the confines of the space that is "accessible" to the sensing device. For example a substantially linear hallway, corridor, etc. would be characterized by a high density of strong connections oriented in a direction substantially parallel to the longitudinal axis of the hallway.

Further still, walls or other obstacles to signals tend to be characterized by a high density of weak connections crossing the corresponding area, since connections between location sensors cannot be made with locations on opposite sides of the obstacle.

Areas with equal or substantially equal density of strong and weak connections are generally indistinguishable and termed "undetermined" in preferred embodiments.

Upon determining the classification of various areas in operation 506, operation 508 includes determining an optimum positioning technique to utilize for each area of the estimated layout, wherein the optimum positioning technique is determined based at least in part on the area type. In preferred approaches, the optimum positioning technique is selected from the group consisting of: fingerprinting, trilateration, triangulation, and combinations thereof.

Where combinations of positioning techniques are to be employed, operation 508 may include evaluating, using a similarity scoring metric, a performance of at least a fingerprinting technique and a trilateration and/or triangulation technique within an "undetermined" type of area within the estimated layout.

Figure 6:
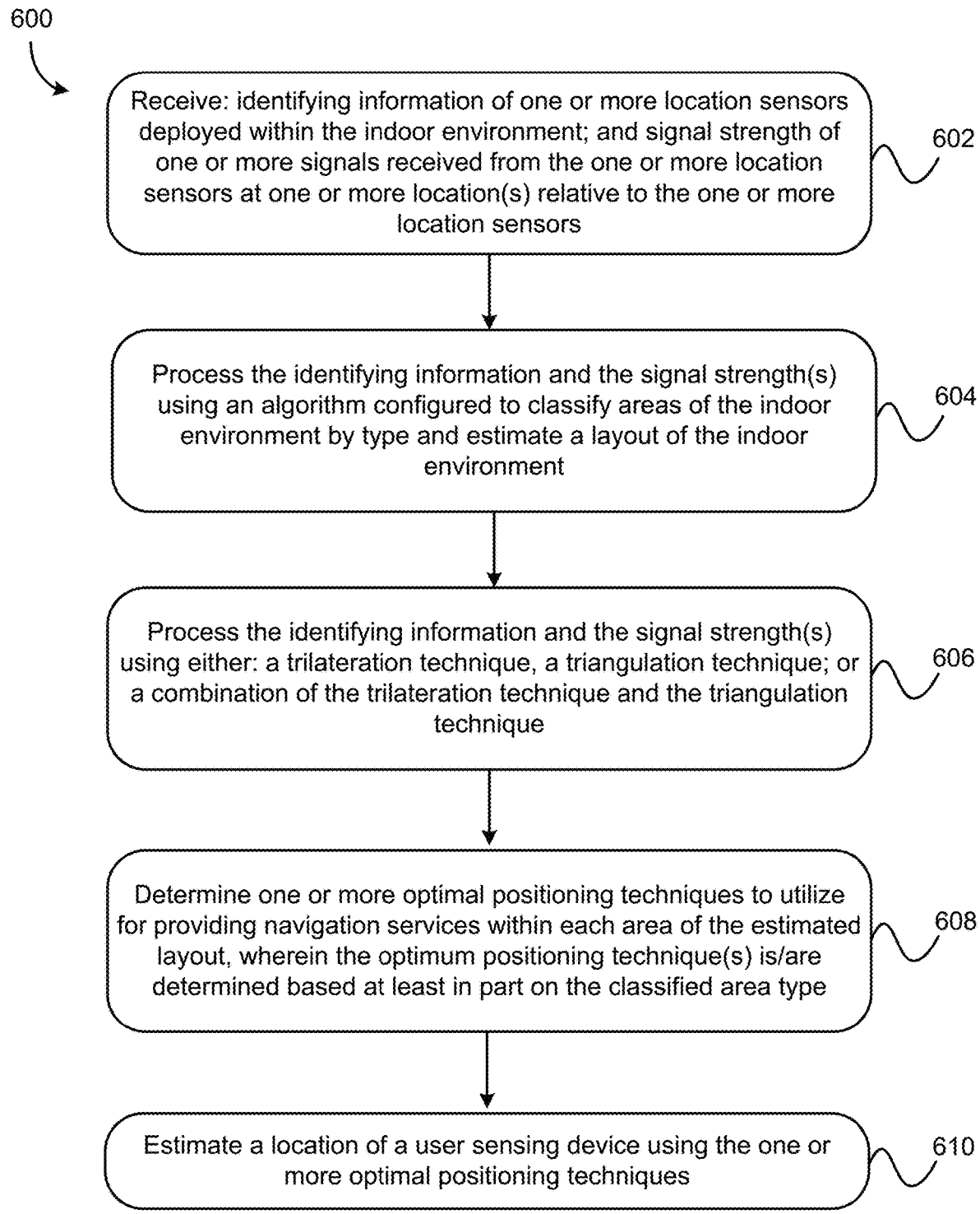
FIG. 6 illustrates flowchart of a method estimating a location of a user within an indoor environment, in accordance with one embodiment.

The method 500 as shown in FIG. 5 has been described in accordance with one exemplary approach, but it shall be appreciated that in various embodiments the inventive concept represented by FIG. 5 and method 500 may include any number of additional and/or alternative features, especially including but not limited to those discussed above regarding FIGS. 3A-4 for estimating location layout and area classification, as well as FIG. 6 and corresponding descriptions regarding providing navigation services and improving positioning based on user feedback, in preferred approaches.

Turning now to FIG. 6, a method 600 for estimating a location of a user within an indoor environment is shown according to one embodiment. The method 600 may be performed in accordance with the present invention in any of the environments depicted in FIGS. 1-4, among others, in various embodiments. Of course, more or less operations than those specifically described in FIG. 6 may be included in method 600, as would be understood by one of skill in the art upon reading the present descriptions.

Each of the steps of the method 600 may be performed by any suitable component of the operating environment. For example, in various embodiments, the method 600 may be partially or entirely performed by a mobile device, or some other device having one or more processors therein. The processor, e.g., processing circuit(s), chip(s), and/or module(s) implemented in hardware and/or software, and preferably having at least one hardware component may be utilized in any device to perform one or more steps of the method 600. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 6, method 600 may initiate with operation 602, where preferably in real-time and from a user operating a sensing device and attempting to navigate an indoor environment, the following information is received. First, identifying information of one or more location sensors deployed within the indoor environment; and second: signal strength of one or more signals received from the one or more location sensors at one or more location(s) relative to the one or more location sensors. The information are preferably received at a central server or workstation providing location services within the indoor environment, but in some approaches a sensing device may be capable of performing all requisite processing, in which case "receiving" the information is synonymous with the sensing device capturing one or more signals including the information of interest, e.g. via a radio antenna, Wi-Fi antenna, Bluetooth antenna, camera, microphone, combinations thereof, or any other suitable mechanism.

As described in greater detail hereinabove, e.g. with regard to the "online phase" the identifying information of location sensors and signal strength of correspondingly received signals may be used to estimate a layout of an indoor environment, and/or classify different types of areas within that environment. Accordingly, in operation 604, method 600 includes processing the identifying information and the signal strength(s) using an algorithm configured to classify areas of the indoor environment and estimate a layout of the indoor environment; while in operation 606, method 600 includes processing the identifying information and the signal strength(s) using a trilateration/triangulation/fingerprinting technique configured to estimate a location based on the distance (for the trilateration technique) or bearing (for the triangulation technique) between a location sensor and the sensing device.

Based on the estimated layout and distances or bearings (for the triangulation technique) from the location sensors, the inventive techniques presented herein may perform an informed estimate as to the most appropriate positioning technique to employ within various areas of the indoor environment. Method 600 accordingly includes operation 608, in which one or more optimal positioning techniques to utilize for providing navigation services within each area of the estimated layout are determined. The optimum positioning technique(s) is/are determined based at least in part on the classified area type, in preferred approaches, and/or number of location sensors sensed at a given location. For instance, if a number of location sensors available/within range is greater than 0 and less than 3, fingerprinting is preferably employed to estimate the layout. If the number of sensors is 3 or more, then fingerprinting, triangulation, trilateration, and/or any combination thereof may be employed, according to various illustrative approaches.

Once armed with the optimal positioning techniques to use in various areas of the indoor environment, a location of a user's sensing device is estimated using one or more such optimal processing techniques in operation 610. Notably, the technique employed may depend on the area type, with closed areas using fingerprinting techniques, open areas using trilateration and/or triangulation techniques, and other areas using a dynamic, combined approach involving fingerprinting as a coarse estimate and triangulation/trilateration as a refinement on estimated position. Preferably, where multiple techniques are used, a similarity scoring metric, or an error metric, is employed to determine relative performance of each, in various area types, and adjustments as to which technique are employed may be implemented based on the relative performance.

The method 600 as shown in FIG. 6 has been described in accordance with one exemplary approach, but it shall be appreciated that in various embodiments the inventive concept represented by FIG. 6 and method 600 may include any number of additional and/or alternative features, especially including but not limited to those discussed above regarding FIGS. 3A-4 for estimating location layout and area classification.

In particularly preferred approaches, method 600 includes receiving user feedback regarding the chosen/employed positioning technique. While method 600 recommends a particular technique based on the foregoing procedures, a user may override the recommendation and dictate other positioning technique(s) be used in other embodiments. In either event, user feedback affirming, negating, or modifying a result achieved using a particular technique can facilitate improving the techniques performance, and appropriate selection thereof, over time for a given environment.

Accordingly, where user feedback is received regarding the chosen/employed positioning technique, the user feedback is analyzed and one or more weights associated with different positioning techniques may be modified. For instance, in one approach method 600 includes reinforcing the one or more optimal positioning techniques in response to user feedback affirming the efficacy of the one or more optimal positioning techniques; and/or demoting the one or more optimal positioning techniques in response to user feedback negating the efficacy of the one or more optimal positioning techniques.

In various embodiments, optimal positioning techniques are associated with weights, e.g. on a scale from 0-1, which influence the likelihood of recommending a given technique in view of another. A given optimal positioning technique, particularly if selected for a given environment, may be particularly advantageous if well adapted to the location in question, and upon receiving user feedback affirming the navigational assistance provided using the given technique, a weight associated therewith may be increased by an incremental amount, increasing likelihood of choosing the given technique in the future (and not just for the chosen site). Similarly, a chosen technique that fails to provide adequate assistance may receive user feedback negating the technique. In response, a weight associated with the negated technique may be lowered to decrease the likelihood of choosing that technique for the same location in the future.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer-implemented method for dynamic, cognitive hybrid positioning within an indoor environment, the method comprising:
   receiving fingerprinting training data corresponding to the indoor environment, trilateration data corresponding to the indoor environment, triangulation data corresponding to the indoor environment, or a combination of the fingerprinting training data, the trilateration data, and/or the triangulation data;
   estimating a layout of the indoor environment based at least in part on the fingerprinting training data;
   classifying at least some areas of the estimated layout according to one of a plurality of predetermined area types;
   determining a positioning technique to utilize for each area of the estimated layout, wherein the positioning technique is determined based at least in part on the area type; and
   evaluating, using a similarity scoring metric or an error metric, a performance of at least a fingerprinting technique and a trilateration/triangulation technique within one of the areas of the estimated layout, wherein the one of the areas of the estimated layout is characterized by a type "undetermined".

2. The method as recited in claim 1, wherein the predetermined area types are selected from the group consisting of: inaccessible spaces, closed spaces, opens spaces, walls, hallways, and undetermined spaces.

3. The method as recited in claim 1, wherein the predetermined area types are classified according to one or more factors selected from the group consisting of: a density of connections characterized by strong signal strength within a predetermined area, a density of connections characterized by weak signal strength within the predetermined area, and combinations thereof.

4. The method as recited in claim 1, wherein the fingerprinting training data comprise:
  a plurality of first (X,Y) locations, each first (X, Y) location corresponding to a location of one of a plurality of location sensors deployed throughout the indoor environment;
  a plurality of second (X,Y) locations, each second (X, Y) location corresponding to a location of a sensing device upon the sensing device receiving one of a plurality of signals from one of the plurality of location sensors;
  identifying information for each of the plurality of location sensors;
  received signal strength indicator (RSSI) information corresponding to each of the plurality of signals received by the sensing device; and
  a plurality of timestamps, each timestamp corresponding to a time of receipt of one of the plurality of signals, by the sensing device.

5. The method as recited in claim 1, wherein the trilateration data comprise:
  a plurality of (X, Y) coordinate pairs, each (X, Y) coordinate pair corresponding to a location of one of a plurality of location sensors deployed throughout the indoor environment; and
  a plurality of distances, each distance describing a distance between a sensing device and one of the plurality of location sensors at a time of the sensing device receiving a signal from the one of the location sensors; and
  wherein the triangulation data comprise:
    the plurality of (X, Y) coordinate pairs; and
    a plurality of bearings, each bearing describing an angle between the sensing device and one of the location sensors at a time of receiving a signal from the one of the location sensors.

6. The method as recited in claim 1, wherein the positioning technique is selected from the group consisting of: fingerprinting, trilateration, triangulation, and combinations thereof.

7. The computer-implemented method as recited in claim 1, comprising estimating a location of a user sensing device using the positioning technique.

8. A computer program product for dynamic, cognitive hybrid positioning within an indoor environment includes a computer readable medium having program instructions embodied therewith, wherein the computer readable medium is not a transitory signal per se, and the program instructions are executable by a processor to cause the processor to perform a method comprising:
  receiving, at the processor, fingerprinting training data corresponding to the indoor environment, trilateration data corresponding to the indoor environment, triangulation data corresponding to the indoor environment, or a combination of the fingerprinting training data, the trilateration data, and/or the triangulation data;
  estimating, using the processor, a layout of the indoor environment based at least in part on the fingerprinting training data;
  classifying, using the processor, at least some areas of the estimated layout according to one of a plurality of predetermined area types; and
  determining, using the processor, a positioning technique to utilize within each area of the estimated layout, wherein the positioning technique is determined based at least in part on the area type; and
  evaluating, using a similarity scoring metric or an error metric, a performance of at least a fingerprinting technique, a triangulation technique, and a trilateration technique within one of the areas of the estimated layout, wherein the one of the areas of the estimated layout is characterized by a type "undetermined".

9. The computer program product as recited in claim 8, wherein the predetermined area types are selected from the group consisting of: inaccessible spaces, closed spaces, opens spaces, walls, hallways, and undetermined spaces.

10. The computer program product as recited in claim 8, wherein the predetermined area types are classified according to one or more factors selected from the group consisting of: a density of connections characterized by strong signal strength within a predetermined area, a density of connections characterized by weak signal strength within the predetermined area, and combinations thereof.

11. The computer program product as recited in claim 8, wherein the fingerprinting training data comprise:
  a plurality of first (X,Y) locations, each first (X, Y) location corresponding to a location of one of a plurality of location sensors deployed throughout the indoor environment;
  a plurality of second (X,Y) locations, each second (X, Y) location corresponding to a location of a sensing device upon the sensing device receiving one of a plurality of signals from one of the plurality of location sensors;
  identifying information for each of the plurality of location sensors;
  received signal strength indicator (RSSI) information corresponding to each of the plurality of signals received by the sensing device; and
  a plurality of timestamps, each timestamp corresponding to a time of receipt of one of the plurality of signals, by the sensing device.

12. The computer program product as recited in claim 8, wherein the trilateration data comprise:
  a plurality of (X, Y) coordinate pairs, each (X, Y) coordinate pair corresponding to a location of one of a plurality of location sensors deployed throughout the indoor environment; and
  a plurality of distances, each distance describing a distance between a sensing device and one of the plurality of location sensors at a time of the sensing device receiving a signal from the one of the location sensors; and
  wherein the triangulation data comprise:
    the plurality of (X, Y) coordinate pairs; and
    a plurality of bearings, each bearing describing an angle between the sensing device and one of the location sensors at a time of receiving a signal from the one of the location sensors.

13. The computer program product as recited in claim 8, wherein the positioning technique is selected from the group consisting of: fingerprinting, trilateration, triangulation, and combinations thereof.

14. A system for dynamic, cognitive hybrid positioning within an indoor environment, comprising:
  a processor; and
  logic integrated with the processor, executable by the processor, or integrated with and executable by the processor, the logic being configured to:
    receive fingerprinting training data corresponding to the indoor environment, trilateration data corresponding to the indoor environment, triangulation data corresponding to the indoor environment, or a combination of the fingerprinting training data, the trilateration data, and/or the triangulation data;

estimate a layout of the indoor environment based at least in part on the fingerprinting training data;

classify at least some areas of the estimated layout according to one of a plurality of predetermined area types;

determine a positioning technique to utilize within each area of the estimated layout, wherein the positioning technique is determined based at least in part on the area type; and evaluate, using a similarity scoring metric or an error metric, a performance of at least a fingerprinting technique, a triangulation technique, and a trilateration technique within one of the areas of the estimated layout, wherein the one of the areas of the estimated layout is characterized by a type "undetermined".

15. The system as recited in claim 14, wherein the positioning technique is selected from the group consisting of: fingerprinting, trilateration, triangulation, and combinations thereof.

16. The system as recited in claim 14, wherein the predetermined area types are selected from the group consisting of: inaccessible spaces, closed spaces, opens spaces, walls, hallways, and undetermined spaces; and wherein the predetermined area types are classified according to one or more factors selected from the group consisting of: a density of connections characterized by strong signal strength within a predetermined area, a density of connections characterized by weak signal strength within the predetermined area, and combinations thereof.

17. The system as recited in claim 14, wherein the fingerprinting training data comprise:

a plurality of first (X,Y) locations, each first (X, Y) location corresponding to a location of one of a plurality of location sensors deployed throughout the indoor environment;

a plurality of second (X,Y) locations, each second (X, Y) location corresponding to a location of a sensing device upon the sensing device receiving one of a plurality of signals from one of the plurality of location sensors;

identifying information for each of the plurality of location sensors;

received signal strength indicator (RSSI) information corresponding to each of the plurality of signals received by the sensing device; and a plurality of timestamps, each timestamp corresponding to a time of receipt of one of the plurality of signals, by the sensing device.

18. The system as recited in claim 14, wherein the trilateration data comprise:

a plurality of (X, Y) coordinate pairs, each (X, Y) coordinate pair corresponding to a location of one of a plurality of location sensors deployed throughout the indoor environment; and a plurality of distances, each distance describing a distance between a sensing device and one of the plurality of location sensors at a time of the sensing device receiving a signal from the one of the location sensors; and wherein the triangulation data comprise:

the plurality of (X, Y) coordinate pairs; and a plurality of bearings, each bearing describing an angle between the sensing device and one of the location sensors at a time of receiving a signal from the one of the location sensors.

19. A computer-implemented method for dynamic, cognitive hybrid positioning within an indoor environment, the method comprising:

receiving fingerprinting training data corresponding to the indoor environment; receiving trilateration data corresponding to the indoor environment, triangulation data corresponding to the indoor environment, or a combination of the trilateration data and the triangulation data, wherein the trilateration data comprise:

a plurality of first (X, Y) coordinate pairs, each first (X, Y) coordinate pair corresponding to a location of one of a plurality of location sensors deployed throughout the indoor environment, and a plurality of distances, each distance describing a distance between a sensing device and one of the plurality of location sensors at a time of the sensing device receiving a signal from the one of the location sensors;

estimating a layout of the indoor environment based at least in part on the fingerprinting training data;

classifying at least some areas of the estimated layout according to one of a plurality of predetermined area types; and determining positioning technique to utilize for each area of the estimated layout, wherein the positioning technique is determined based at least in part on the area type.

20. The method as recited in claim 19, wherein the predetermined area types are selected from the group consisting of: inaccessible spaces, closed spaces, opens spaces, walls, hallways, and undetermined spaces.

21. The method as recited in claim 19, wherein the fingerprinting training data comprise:

a plurality of first (X,Y) locations, each first (X, Y) location corresponding to a location of one of a plurality of location sensors deployed throughout the indoor environment;

a plurality of second (X,Y) locations, each second (X, Y) location corresponding to a location of a sensing device upon the sensing device receiving one of a plurality of signals from one of the plurality of location sensors;

identifying information for each of the plurality of location sensors;

received signal strength indicator (RSSI) information corresponding to each of the plurality of signals received by the sensing device; and a plurality of timestamps, each timestamp corresponding to a time of receipt of one of the plurality of signals, by the sensing device.

22. The method as recited in claim 19, wherein the triangulation data further comprises:

a plurality of bearings, each bearing describing an angle between the sensing device and one of the location sensors at a time of receiving a signal from the one of the location sensors.

* * * * *